(12) United States Patent
Mao et al.

(10) Patent No.: US 12,366,897 B2
(45) Date of Patent: Jul. 22, 2025

(54) ELECTRONIC DEVICE

(71) Applicant: VIVO MOBILE COMMUNICATION CO., LTD., Dongguan (CN)

(72) Inventors: Xujun Mao, Dongguan (CN); Yao Xiao, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 163 days.

(21) Appl. No.: 18/206,603

(22) Filed: Jun. 6, 2023

(65) Prior Publication Data
US 2023/0315165 A1 Oct. 5, 2023

Related U.S. Application Data

(63) Continuation of application No. PCT/CN2021/135271, filed on Dec. 3, 2021.

(30) Foreign Application Priority Data

Dec. 9, 2020 (CN) .......................... 202011447600.4

(51) Int. Cl.
*G06F 1/16* (2006.01)
*F16C 11/04* (2006.01)

(52) U.S. Cl.
CPC ............ *G06F 1/1681* (2013.01); *F16C 11/04* (2013.01); *G06F 1/1616* (2013.01); *G06F 1/1679* (2013.01)

(58) Field of Classification Search
CPC .... G06F 1/1681; G06F 1/1616; G06F 1/1679; F16C 11/04
See application file for complete search history.

(56) References Cited

U.S. PATENT DOCUMENTS 10,931,070 B1 * 2/2021 Files .................... H01R 9/0524
2005/0050686 A1 3/2005 Kurokawa
(Continued)

FOREIGN PATENT DOCUMENTS

CN 1497123 A 5/2004
CN 201265592 Y 7/2009
(Continued)

OTHER PUBLICATIONS

18206603_2025-01-10_CN_211693207_U_M.pdf (Year: 2020).*
(Continued)

*Primary Examiner* — Allen L Parker
*Assistant Examiner* — Elisa Sasserath
(74) *Attorney, Agent, or Firm* — IPX PLLC

(57) ABSTRACT

An electronic device that relates to the technical field of display screens is provided. The electronic device includes a first display screen, a second display screen, and a hinge mechanism. The hinge mechanism includes a support piece and two rotating components disposed in parallel along an axis. Each of the rotating components includes a drive shaft, a drive gear, and two locking components. The drive gear is fixedly disposed on a central area of the drive shaft. The first display screen is fixedly connected to the drive shaft of one of the rotating components, and the second display screen is fixedly connected to the drive shaft of the other rotating component. Each of two ends of the drive shaft is connected to the support piece by using one of the locking components.

8 Claims, 3 Drawing Sheets

(56) References Cited

U.S. PATENT DOCUMENTS

| | | | | |
|---|---|---|---|---|
| 2011/0094160 A1* | 4/2011 | Houser | ................... | E05F 15/63 49/31 |
| 2016/0186474 A1 | 6/2016 | Tong et al. | | |
| 2018/0292863 A1 | 10/2018 | Escamilla | | |

FOREIGN PATENT DOCUMENTS

| | | | |
|---|---|---|---|
| CN | 109979324 A | | 7/2019 |
| CN | 110572496 A | | 12/2019 |
| CN | 110905908 A | | 3/2020 |
| CN | 211016292 U | | 7/2020 |
| CN | 211693207 U | * | 10/2020 |
| CN | 211702093 U | | 10/2020 |
| CN | 112540650 A | | 3/2021 |
| EP | 3506046 A1 | | 7/2019 |
| JP | 2006064000 A | | 3/2006 |
| JP | 2008275139 A | | 11/2008 |
| WO | 2008100013 A1 | | 8/2008 |

OTHER PUBLICATIONS

Extended European Search Report issued in related European Application No. 21902496.5, mailed Apr. 17, 2024, 8 pages.
International Search Report issued in corresponding International Application No. PCT/CN2021/135271, mailed Feb. 25, 2022, 7 pages.
First Office Action issued in corresponding CN Patent Application No. 202011447600.4, dated Aug. 2, 2022, 10 pages.
Second Office Action issued in corresponding CN Patent Application No. 202011447600.4, dated Apr. 21, 2023, 6 pages.

* cited by examiner

ELECTRONIC DEVICE

CROSS-REFERENCE TO RELATED APPLICATIONS

This application is a continuation of International Application No. PCT/CN2021/135271, filed on Dec. 3, 2021, which claims priority to Chinese Patent Application No. 202011447600.4, filed on Dec. 9, 2020. The entire contents of each of the above-referenced applications are expressly incorporated herein by reference.

TECHNICAL FIELD

This application relates to the technical field of display screens, and in particular, to an electronic device.

BACKGROUND

With the development of terminal display technologies, foldable terminals with larger display areas and offering more convenience for carrying have become the mainstream on the market. At present, foldable screens come in two types, that is, in-folding and out-folding. In-folding means that a screen folds inward into a folding mechanism after being folded up and is not in contact with the outside, and therefore provides great protection for the screen. However, when there is a need to view information on the screen, a folded-up phone has to be unfolded through relatively not-so-easy operations. Out-folding means that a screen folds outward to cover up the exterior of a phone after being folded up. With this type of folding, both sides can display information, and one side can interact with the other. However, as the screen is on the outside, the screen can easily get scratches, affecting a display effect, or the screen can be broken when being dropped, reducing a lifespan of the screen. Therefore, dual-folding foldable screens have great market prospects.

However, at present, during unfolding and folding of a dual-folding foldable screen, as there are a few supporting points between a folding mechanism and the foldable screen, the screen lacks symmetry. When the screen is unfolded from the top or bottom of the screen, different forces for unfolding lead to uneven pressure on the screen, and the folding mechanism can easily be broken after repeated times of folding, damaging and reducing a lifespan of the foldable screen. Moreover, because of asymmetry, weight distribution of a whole device is uneven, bringing poor experience of holding the whole device in a hand.

SUMMARY

The objective of the embodiments of this application is to provide an electronic device.

This application is implemented as follows.

The embodiments of the present application provide an electronic device. The electronic device includes a first display screen, a second display screen, and a hinge mechanism. The hinge mechanism includes a support piece and two rotating components disposed in parallel along an axis; and each of the rotating components includes a drive shaft, a drive gear, and two locking components.

The drive gear is fixedly disposed on a central area of the drive shaft.

The first display screen is fixedly connected to the drive shaft of one of the rotating components, and the second display screen is fixedly connected to the drive shaft of the other rotating component, so that the first display screen and the second display screen are capable of relative rotating, by engagement of the drive gears of the two rotating components, to fold or unfold the electronic device.

Each of two ends of the drive shaft is connected to the support piece by using one of the locking components, and through a locking effect of the two locking components, the first display screen and the second display screen are capable of staying at any relative angle.

In some embodiments, the locking component includes a fixed shaft, a spring, a first special-shape gear, and a second special-shape gear. The first special-shape gear is fixedly disposed at one end of the drive shaft, the second special-shape gear is fixedly disposed at one end of the fixed shaft, the other end of the fixed shaft is inserted into the support piece, and the spring is sleeved on the fixed shaft, so that the first display screen and the second display screen are capable of staying at any relative angle by engagement of the first special-shape gear and the second special-shape gear.

In some embodiments, the locking component includes a first frictional disc and a second frictional disc. The first frictional disc is fixedly disposed at one end of the drive shaft, and the second frictional disc is connected to the support piece, so that the first display screen and the second display screen are capable of staying at any relative angle with damping between the first frictional disc and the second frictional disc.

In some embodiments, the locking component includes a nut, a lead screw, and a spring. Each of two ends of the drive shaft is coaxial with and fixedly connected to one lead screw, the lead screw is disposed through the nut, the spring is sleeved on the lead screw and abutted on the nut and the support piece, and the nut moves in an axial direction of the lead screw by coordination between the lead screw and the nut to deform the spring, so that the first display screen and the second display screen stay at any relative angle.

In some embodiments, there are at least two hinge mechanisms, and the at least two hinge mechanisms are arranged in an axial direction, and adjacent support pieces of two adjacent hinge mechanisms are fixedly connected to each other.

In some embodiments, a sliding slot is provided on the support piece, the fixed shaft is inserted into the sliding slot, and the fixed shaft is capable of moving in the sliding slot in an axial direction of the fixed shaft.

In some embodiments, the hinge mechanism further includes a coupling piece, and the two rotating components are connected to each other by using the coupling piece.

In some embodiments, at least one connection piece is fixedly provided on the drive shaft, and the first display screen and the second display screen each are fixedly connected to the drive shaft by using the connection piece.

In some embodiments, the connection piece is a folding hinge butt.

In the embodiments of this application, by providing symmetric locking components, a hinge gets more even pressure in an axial direction, so that stability when a foldable screen is folded or unfolded can be improved, to increase a lifespan of the hinge with enhanced damping when a user is folding the screen.

DETAILED DESCRIPTION

The following clearly describes the technical solutions in the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art without creative efforts fall within the protection scope of this application.

The terms "first", "second", and the like in the description and the claims of this application are used to distinguish between similar objects, and do not need to be used to describe a specific order or sequence. It should be understood that, data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in the specification and the claims, "and/or" represents at least one of connected objects, and a character "/" generally represents an "or" relationship between associated objects.

With reference to the accompanying drawings, an electronic device provided in the embodiments of this application will be described in detail by using specific examples and application scenarios thereof.

Figure 1:
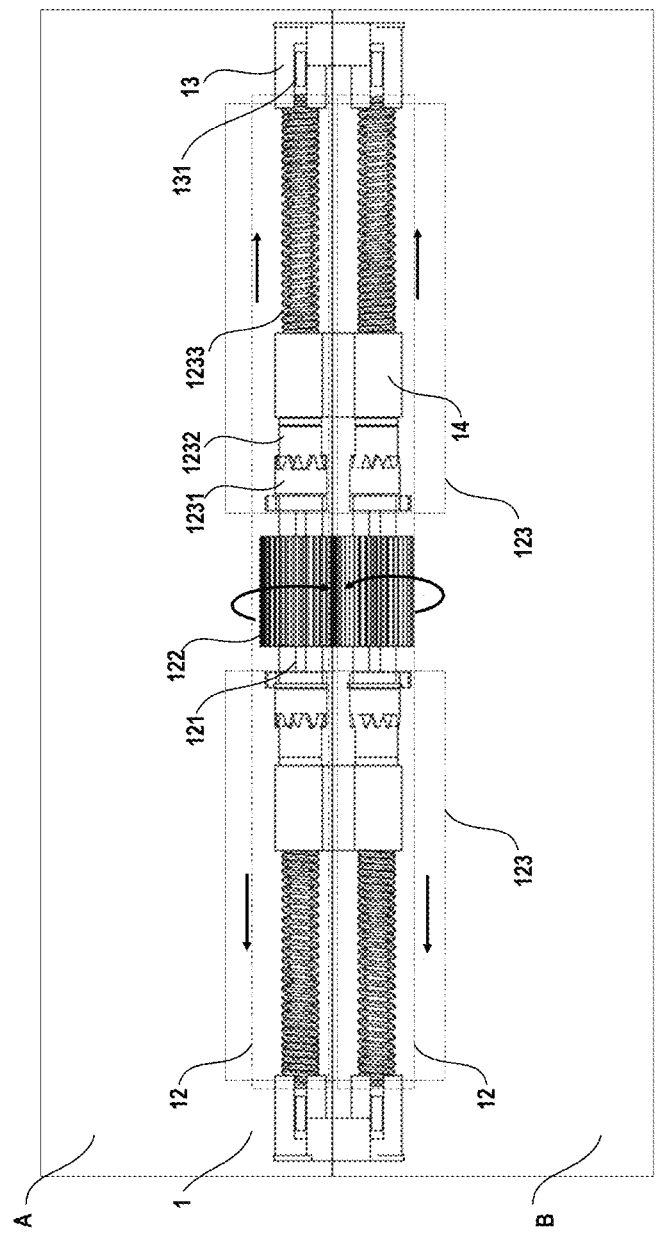
FIG. 1 is a schematic diagram of one hinge mechanism included in an electronic device according to an embodiment of this application.

FIG. 1 is a schematic diagram of a structure of one hinge mechanism included in an electronic device according to an embodiment of this application. As shown in FIG. 1, the electronic device according to this embodiment of this application includes a first display screen A, a second display screen B, and a hinge mechanism 1. The hinge mechanism 1 includes a support piece 13 and two rotating components 12 disposed in parallel along an axis, the axis refers to an axis of rotation of the rotating components 12, and each of the rotating components 12 includes a drive shaft 121, a drive gear 122, and two locking components 123. The drive gear 122 is fixedly disposed on a central area of the drive shaft 121. Axes of the drive shaft 121 and the drive gear 122 overlap each other, and when the drive gear 122 turns, the drive shaft 121 turns synchronously. The first display screen A is fixedly connected to the drive shaft 121 of one of the rotating components 12, and the second display screen B is fixedly connected to the drive shaft 121 of the other rotating component 12. Two drive gears 122 of the two rotating components 12 are engaged, so that the first display screen A and the second display screen B that are separately fixed to two drive shafts 121 are capable of relative rotating, by engagement of the two drive gears 122, to fold or unfold the electronic device. In addition, each of two ends of the drive shaft 121 is connected to the support piece 13 by using one of the locking components 123. That is, the two locking components 123 are symmetrically distributed at the two ends of the drive shaft 121. Through a locking effect of the two locking components 123, that is, through resistance provided by the locking components 123 to hinder rotation of the drive shaft 121, the drive shaft 121 can stop rotating relative to the support piece 13, so that the first display screen A and the second display screen B that are separately fixed to two drive shafts 121 are capable of staying at any relative angle.

In this embodiment of this application, the two rotating components 12 are engaged by using the two drive gears 122, to ensure steadiness and smoothness of folding a screen of the electronic device. In addition, the two locking components 123 are symmetrically disposed at the two ends of the drive shaft 121 for more even weight distribution of the hinge mechanism 1, so that the hinge mechanism 1 gets more balanced pressure, and a lifespan of the hinge mechanism 1 is increased.

In some embodiments of this application, at least one connection piece is fixedly provided on the drive shaft 121, and the first display screen A and the second display screen B each are fixedly connected to the drive shaft 121 by using the connection piece. In some embodiments, one connection piece may be provided at each of the two ends of the drive shaft 121. The first display screen A is fixedly connected to the drive shaft 121 of one of the rotating components 12 by using the two connection pieces, and the second display screen B is fixedly connected to the drive shaft 121 of the other rotating component 12 also by using the two connection pieces. By providing one connection piece at each of the two ends of the drive shaft 121, pressure transmission between the first display screen A/second display screen B and the drive shaft 121 can be more balanced, so that firmness of connection between the hinge mechanism 1 and the first display screen A/second display screen B can be improved.

Figure 4:
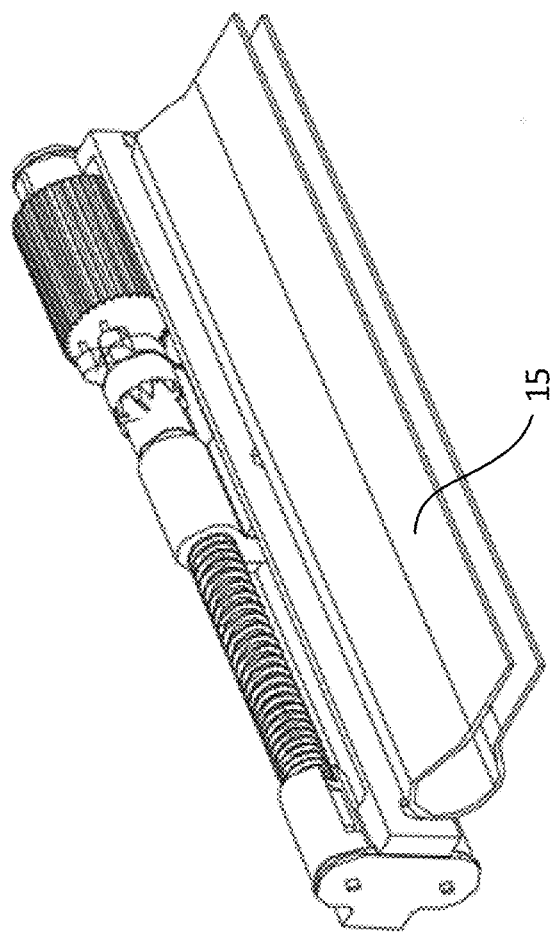
FIG. 4 is a schematic diagram of a screen in in-folding according to an embodiment of this application.
Figure 5:
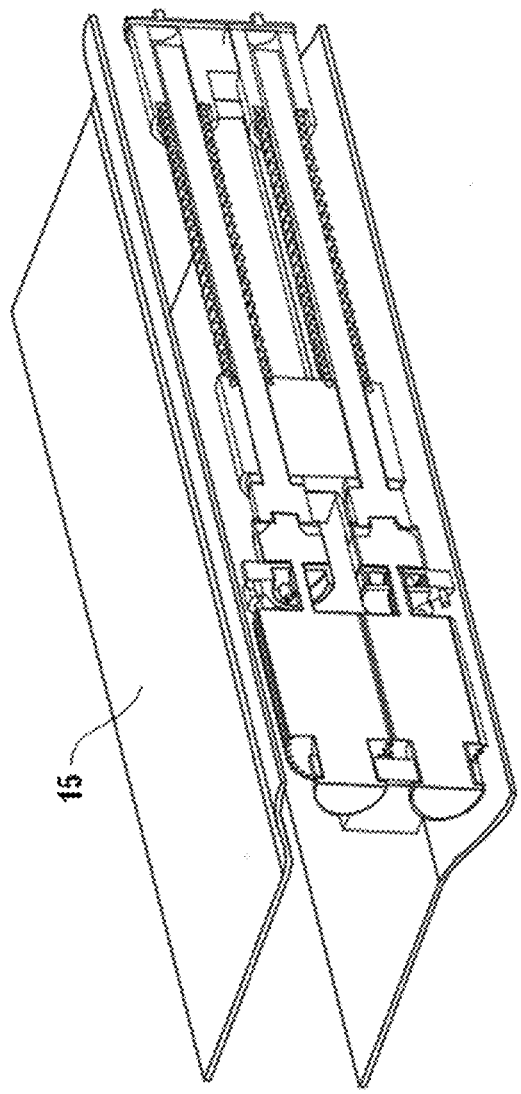
FIG. 5 is a schematic diagram of a screen in out-folding according to an embodiment of this application.

In an implementation, the connection piece is a folding hinge butt 15 (as shown in FIG. 4 and FIG. 5), and the folding hinge butt 15 may be fixedly connected to the first display screen A/second display screen B by using a screw.

Still refer to FIG. 1, in this embodiment of this application, each of the locking components 123 includes a fixed shaft, a spring 1233, a first special-shape gear 1231, and a second special-shape gear 1232. The first special-shape gear 1231 is fixedly disposed at one end of the drive shaft 121 (e.g., one first special-shape gear 1231 is provided at each of the two ends of the drive shaft 121). The second special-shape gear 1232 is fixedly disposed at one end of the fixed shaft, and the other end of the fixed shaft is inserted into the support piece 13. The fixed shaft and the drive shaft 121 are in coaxial arrangement. The spring 1233 is sleeved on the fixed shaft and may be abutted on second special-shape gear 1232 and the support piece 13. The first special-shape gear 1231 and the second special-shape gear 1232 are arranged relative to each other. The first display screen A and the second display screen B are capable of staying at any relative angle by engagement of the first special-shape gear 1231 and the second special-shape gear 1232. For example, when the first display screen A and the second display screen B are being folded with external force, as the first display screen A and the second display screen B each are fixedly connected to one of the drive shafts 121, the drive shafts 121 move and induce rotation of the first special-shape gear 1231 at the two ends of the drive shaft 121. The first special-shape gear 1231 and the second special-shape gear 1232 move together by engagement, to deform the spring 1233 on the fixed shaft during rotation and provide elastic force to increase resistance during the rotation, so that damping is enhanced when the screen of the electronic device is being folded. When the first special-shape gear 1231 and the second special-shape gear 1232 rotate to a specific angle, if the external force is taken back, because the first special-shape gear 1231 and the second special-shape gear 1232 abut against each other, the two gears do not rotate relatively any more. Therefore, the drive shaft 121 fixed to the first special-shape gear 1231 stops rotating, and the first display screen A/second display screen B fixedly connected to the drive shaft 121 also stops rotating, to implement locking of the first display screen A and the second display screen B at any relative angle.

In some embodiments of this application, a sliding groove 131 is provided on the support piece 13. An end of the fixed shaft that is farther away from the second special-shape gear 1232 is inserted into the sliding groove 131, and the fixed shaft is capable of moving in the sliding groove 131 in an axial direction of the fixed shaft, to press and deform the spring 1233 to provide resistance, thereby enhancing damping during folding.

In some implementations of this application, the spring 1233 may be replaced with an elastomer made of another elastomer material, provided that resistance can be provided to hinder rotation of the drive shaft 121.

In some embodiments of this application, the hinge mechanism 1 further includes a coupling piece 14, and the two rotating components 12 that are disposed in parallel along an axial direction are connected to each other by using the coupling piece 14, to improve structural strength of the hinge mechanism 1 and avoid a change of a distance between the two rotating components 12 during rotation, thereby ensuring steadiness during folding. For example, the coupling piece 14 may be disposed between the second special-shape gear 1232 and the spring 1233. The fixed shaft goes through the coupling piece 14, and may rotate in the coupling piece 14.

In some other embodiments of this application, the locking component 123 may include a first frictional disc and a second frictional disc. The first frictional disc is fixedly disposed at one end of the drive shaft 121 (e.g., one first frictional disc is provided at each of the two ends of the drive shaft 121), and when the drive shaft 121 rotates, the first frictional disc rotates synchronously. The second frictional disc is connected to the support piece 13. The first frictional disc and the second frictional disc are in contact with damping. For example, a disc surface on which the first frictional disc and the second frictional disc come in contact is perpendicular to an axis of the drive shaft 121. Therefore, when the first display screen A/second display screen B is driven by external force, the drive shaft 121 fixedly connected to the first display screen A/second display screen B rotates, and the first frictional disc and the second frictional disc slide with damping. The external force needs to overcome resistance between the first frictional disc and the second frictional disc to rotate the first display screen A/second display screen B. Based on this, by designing a magnitude of a sliding damping force between the first frictional disc and the second frictional disc (e.g., by adjusting pressure on the surface where the two discs come in contact), a magnitude of the external force for rotating the first display screen A/second display screen B can be adjusted, to satisfy requirements of different users on folding damping of a foldable screen, and enhance damping during folding. After the external force is taken back, because of the damping force provided by the first frictional disc and the second frictional disc, the drive shaft 121 stops rotating, so that the first display screen A and the second display screen B stay unchanged at any relative angle. In this embodiment of this application, by designing the locking component 123 into a frictional disc structure, a dimension of the hinge mechanism 1 can be smaller, thereby reducing a thickness of the electronic device manufactured using the hinge mechanism 1.

In still another implementation of this application, the locking component 123 includes a nut, a lead screw, and a spring. One end of the drive shaft 121 is coaxial with and fixedly connected to the lead screw (e.g., each of the two ends of the drive shaft 121 is coaxial with and fixedly connected to one lead screw). The lead screw is disposed through the nut, the spring is sleeved on the lead screw and abutted on the nut and the support piece 13. The nut moves in an axial direction of the lead screw by coordination between the lead screw and the nut to deform the spring, so that the first display screen A and the second display screen B stay at any relative angle. For example, when the first display screen A/second display screen B is driven by external force, the first display screen A/second display screen B turns the drive shaft 121 connected fixedly to rotate synchronously, and the drive shaft 121 further turns the lead screw connected fixedly to rotate. As the lead screw is disposed around the nut, the lead screw turns the nut to move in the axial direction of the lead screw to deform the spring, to provide resistance during folding to enhance damping of folding. When the external force is taken back, because of a screw-thread connection relationship between the nut and the lead screw, the nut and the lead screw stop rotating, and the first display screen A/second display screen B stops rotating, so that the first display screen A and the second display screen B stay at any relative angle. In this embodiment of this application, by providing the locking component 123 as a screw-thread push rod mechanism, not only better self-locking is easily implemented, but there also is a greater structural strength of a hinge for the foldable screen, prolonging a lifespan.

Figure 2:
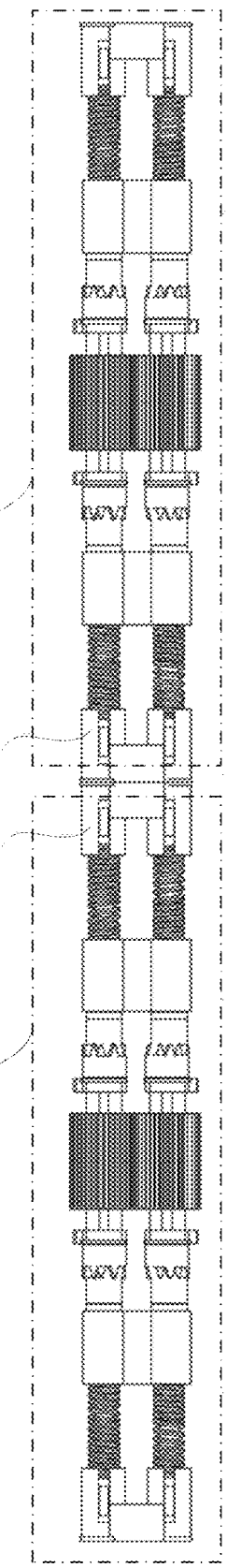
FIG. 2 is a schematic diagram of two hinge mechanisms included in an electronic device according to an embodiment of this application.
Figure 3:
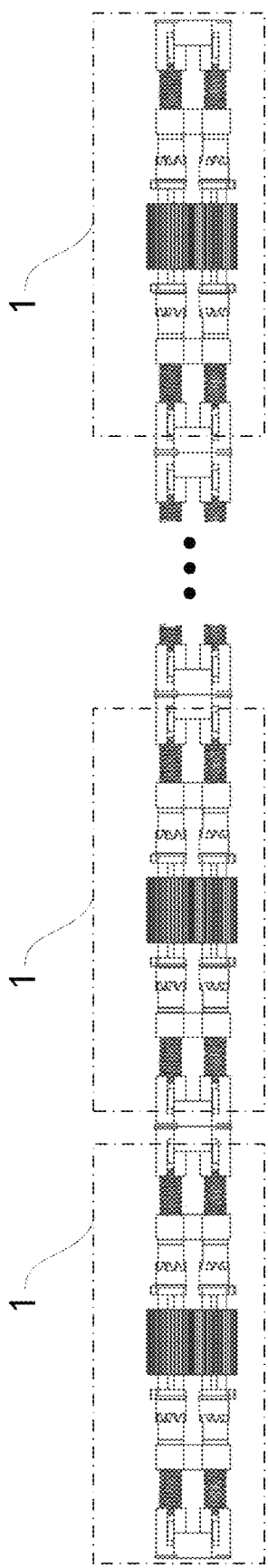
FIG. 3 is a schematic diagram of a plurality of hinge mechanisms included in an electronic device according to an embodiment of this application.

Refer to FIG. 2 and FIG. 3. FIG. 2 is a schematic diagram of two hinge mechanisms included in an electronic device according to an embodiment of this application. FIG. 3 is a schematic diagram of a plurality of hinge mechanisms included in an electronic device according to an embodiment of this application. As shown in FIG. 2 and FIG. 3, in the embodiments of this application, a quantity of the hinge mechanism 1 used for the electronic device may be one, two, or even more. When there are at least two hinge mechanisms 1, the hinge mechanisms 1 are arranged in an axial direction of the rotating components 12, and adjacent support pieces 13 of two adjacent hinge mechanisms 1 are fixedly connected to each other. With more hinge mechanisms 1, a folding force can be distributed to the axial direction of the whole rotating components 12, so that when the first display screen A/second display screen B is being unfolded or folded up and external force acts on any position on the first display screen A/second display screen B, the first display screen A/second display screen B can get even pressure on the rotating components 12. In addition, with more hinge mechanisms 1, dimensions of the drive gear 122, the locking component 123, and the like may be further reduced, to get a smaller radial dimension of the hinge mechanisms 1, so that a thickness of the electronic device is reduced, and the whole device has an aesthetic look.

Refer to FIG. 4 and FIG. 5. FIG. 4 is a schematic diagram of a screen in in-folding according to an embodiment of this application. FIG. 5 is a schematic diagram of a screen in out-folding according to an embodiment of this application. As shown in FIG. 4 and FIG. 5, the electronic device according to the embodiments of this application can be folded by in-folding or out-folding. In these two folding manners, one or more hinge mechanisms 1 are used, so that a thickness of the whole device is smaller. It should be noted that, FIG. 4 and FIG. 5 show merely a part of a structure of the hinge mechanism 1. For the detailed structure, refer to FIG. 1 to FIG. 3.

According to the electronic device in this application, by providing symmetric locking components, a hinge can get more even pressure in an axial direction, so that steadiness of folding and unfolding a foldable screen can be improved, and a lifespan of the hinge is prolonged with enhanced damping when a user folds the screen.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that a scope of the method and the apparatus in the implementations of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

The embodiments of this application are described with reference to the accompanying drawings. However, this application is not limited to the foregoing implementations. The foregoing implementations are merely examples, but are not limiting. Under the enlightenment of this application, a person of ordinary skill in the art may make many forms without departing from the objective and the scope of the claims of this application, and these forms all fall within the protection scope of this application.

The invention claimed is:

1. An electronic device, comprising: a first display screen; a second display screen; and a hinge mechanism, wherein:
    the hinge mechanism comprises a support piece and two rotating components disposed in parallel along an axis, and each of the rotating components comprises a drive shaft, a drive gear, and two locking components,
    the drive gear is fixedly disposed on a central area of the drive shaft,
    the first display screen is fixedly connected to the drive shaft of one of the rotating components, and the second display screen is fixedly connected to the drive shaft of the other rotating component, so that the first display screen and the second display screen are capable of relative rotating, by engagement of the drive gears of the two rotating components, to fold or unfold the electronic device, and
    each of two ends of the drive shaft is connected to the support piece by using one of the locking components, and through a locking effect of the two locking components, the first display screen and the second display screen are capable of staying at any relative angle,
    wherein the locking component comprises a nut, a lead screw, and a spring, wherein each of two ends of the drive shaft is coaxial with and fixedly connected to one lead screw, the lead screw is disposed through the nut, the spring is sleeved on the lead screw and abutted on the nut and the support piece, and the nut moves in an axial direction of the lead screw by coordination between the lead screw and the nut to deform the spring, so that the first display screen and the second display screen stay at any relative angle.

2. The electronic device according to claim 1, wherein the locking component comprises a fixed shaft, a spring, a first special-shape gear, and a second special-shape gear, wherein the first special-shape gear is fixedly disposed at one end of the drive shaft, the second special-shape gear is fixedly disposed at one end of the fixed shaft, the other end of the fixed shaft is inserted into the support piece, and the spring is sleeved on the fixed shaft, so that the first display screen and the second display screen are capable of staying at any relative angle by engagement of the first special-shape gear and the second special-shape gear.

3. The electronic device according to claim 1, wherein the locking component comprises a first frictional disc and a second frictional disc, wherein the first frictional disc is fixedly disposed at one end of the drive shaft, and the second frictional disc is connected to the support piece, so that the first display screen and the second display screen are capable of staying at any relative angle with damping between the first frictional disc and the second frictional disc.

4. The electronic device according to claim 1, wherein there are at least two hinge mechanisms, wherein the at least two hinge mechanisms are arranged in an axial direction, and adjacent support pieces of two adjacent hinge mechanisms are fixedly connected to each other.

5. The electronic device according to claim 2, wherein:
    a sliding groove is provided on the support piece,
    the fixed shaft is inserted into the sliding groove, and
    the fixed shaft is capable of moving in the sliding groove in an axial direction of the fixed shaft.

6. The electronic device according to claim 1, wherein the hinge mechanism further comprises a coupling piece, and the two rotating components are connected to each other by using the coupling piece.

7. The electronic device according to claim 1, wherein at least one connection piece is fixedly provided on the drive shaft, and the first display screen and the second display screen each are fixedly connected to the drive shaft by using the connection piece.

8. The electronic device according to claim 7, wherein the connection piece is a folding hinge butt.

* * * * *